July 19, 1966     A. J. HAUCK     3,262,045
REGULATED D.C. POWER SUPPLY
Filed July 19, 1962
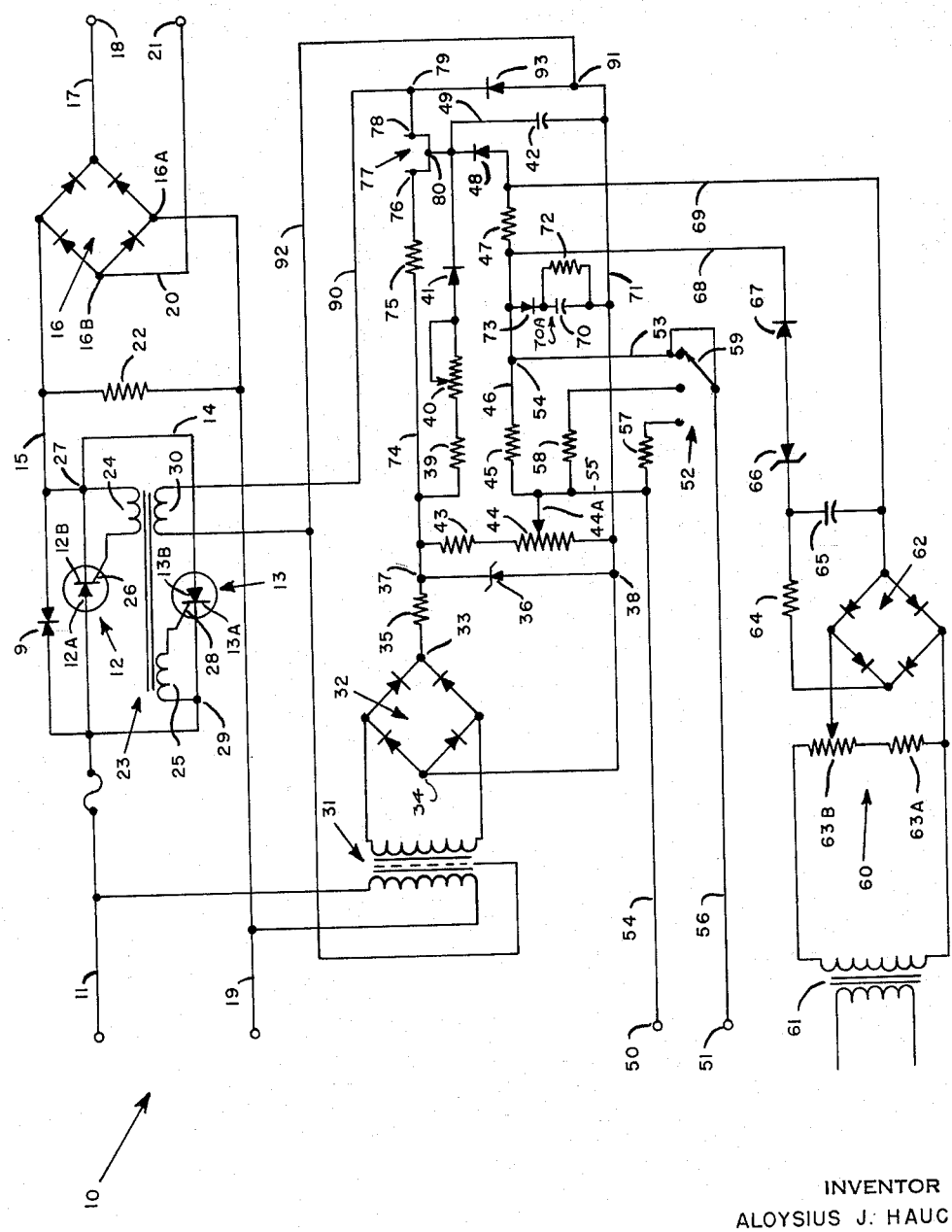
INVENTOR
ALOYSIUS J. HAUCK
BY
*Robertson* & *Smythe*
ATTORNEYS 3,262,045
REGULATED D.C. POWER SUPPLY
Aloysius J. Hauck, Milwaukee, Wis., assignor to Basic Products Corporation, Milwaukee, Wis., a corporation of Wisconsin
Filed July 19, 1962, Ser. No. 210,988
4 Claims. (Cl. 321—16)

This invention relates to regulators and particularly to an arrangement having a plurality of input loads and employing a unijunction transistor.

It is desirable to be able to operate silicon controlled rectifiers in response to a plurality of input signals rather than to a single signal. Among the means previously used to operate with a plurality of input signals was a magnetic amplifier type network for generating the firing pulses for silicon controlled rectifiers. By winding the magnetic amplifier with a plurality of control windings, the magnetic amplifier and the controlled rectifiers could be made responsive to a plurality of control or input signals. With a unijunction firing circuit, it has been difficult in the past to introduce more than one signal into the firing circuit.

One of the objects of the invention is to provide a circuit which will control an output voltage from a plurality of input signals without the use of a bulky magnetic amplifier firing circuit.

In one aspect of the invention, an A.C. input is connected through a silicon controlled rectifier bridge means to a load. There may be a rectifier arrangement connected between the bridge and the load. The gating terminals of the silicon controlled rectifiers are connected to a pulse transformer, the pulse transformer being connected to the output of a unijunction transistor. An input signal resistance network is connected across a charging capaictor the charging rate of which is controlled thereby. There are a plurality of input signals connected to the resistance network. A regulated D.C. voltage is connected through the resistance network to the charging capacitor. The unijunction transistor will fire when the charging capacitor reaches a predetermined level so as to generate gating pulses in the pulse transformer for operating the silicon controlled rectifier means. In one form, one of the input signals can be from a current limiting arrangement. Time-delay circuit means can be employed to provide gradual energization upon initially turning on the circuit.

The system can be used for various purposes such as for controlling the control winding of saturable reactors so as to control output voltage in response to a D.C. input signal.

The above as well as other objects and novel features of the invention will become apparent from the following specification and accompanying drawing which is merely exemplary.

In the drawing:

The sole figure is a wiring diagram of one form of the invention.

The circuit will be described in conjunction with a single-phase arrangement but it is to be understood that it may be used for more than one phase if desired. The A.C. input is at 10. Lead 11 is connected to the anode 12A of silicon controlled rectifier 12 and to the cathode 13A of silicon controlled rectifier 13. The cathode 12B of silicon controlled rectifier 12 is connected to the anode 13B of silicon controlled rectifier 13 by means of lead 14. Thus, the silicon controlled rectifiers are connected between lead 11 and lead 15 on the output side thereof. Suppressor 9 breaks down when the voltage reaches a predetermined value higher than the normal operating voltages which appear across the rectifier. Lead 15 is connected to the rectifier bridge network 16, the output of the rectifier bridge network 16 being connected by lead 17 to output terminal 18.

Lead 19 is connected to rectifier bridge 16 at 16A. Terminal 16B of rectifier bridge 16 is connected by lead 20 to output terminal 21. Resistance 22 serves as a bleeder resistor in case there is an inductive load.

Pulse transformer 23 has two secondary windings 24, 25. One terminal of winding 24 is connected to gate terminal 26 of controlled rectifier 12. The opposite end of secondary winding 24 is connected to the cathode terminal of silicon controlled rectifier 12 at junction 27. One side of secondary winding 25 is connected to gate terminal 28 of silicon controlled rectifier 13, the opposite end of secondary winding 25 being connected to the cathode of silicon controlled rectifier 13 at terminal 29. Transformer 23 has a primary winding 30.

Transformer 31 supplies rectifier bridge 32, rectifier bridge 32 being connected at terminals 33 and 34 to a resistance network about to be described. Resistor 35 and Zener diode 36 provide a regulated voltage between terminals 37 and 38. Resistances 39, 40 and diode 41 are connected to a path for charging capacitor 42 independently of a signal. Resistor 43 and resistor 44 provide a reduced voltage to resistor 45. Resistor 45 is connected to capacitor 42 by means of resistor 47, leads 46 and 49, and diode 48.

The signal input may be at terminals 50 and 51. Range switch 52 may be provided if more than one range is to be employed. The range switch is shown in position so that it connects signal input terminal 51 to lead 53, which in turn is connected at junction 54 to lead 46 between resistance 45 and resistance 47.

Signal input terminal 50 is connected by lead 54 with resistor 45 through lead 55. Terminal 51 is connected by lead 56 to range switch 52 which can be used to choose resistors 57, 58 and 45 in various combinations.

In the form shown, the second signal is a current limiting signal in network 60. It is to be understood, however, that other types of networks or more than one signal can be applied to the circuit. As an example, it may be desirable to linearize the amplifier by having voltage feedback. The secondary of current transformer 61 is shown connected to the bridge circuit 62 through resistances 63A and 63B. The output of the bridge circuit 62 is filtered by resistor 64 and capacitor 65 and is applied to Zener diode 66 and diode 67 and thence to resistor 47 through leads 68 and 69.

When a voltage proportional to the current to be limited appearing across capacitor 65 exceeds the breakdown voltage of Zener diode 66, a current is passed through diode 67 and resistor 47 to develop a voltage across resistor 47 proportional to the current which has exceeded the desired current limit value.

A time-delay network is shown at 70A connected across lead 46 and lead 71, bleed resistor 72 and diode 73 being connected therein. This permits use of a transformer or other devices having in-rush transients at leads 15 and 19. When initially energized, charging of capacitor 70A delays the firing of unijunction transistor 77 long enough to permit the rest of the circuit to come to its operating condition and voltages. Diode 73 is used to block discharge of capacitor 70 through the rest of the network. Resistor 72 permits the discharge of capacitor 70 after the unit is shut off. This action allows the circuit to be prepared for the next actuation or turn-on.

Lead 74 is connected to terminal 37 and resistor 75 and to "base 2," 76, of unijunction transistor 77. "Base 1," 78, of unijunction transistor 77 is connected to junction 79 of the circuit, and emitter terminal 80 of unijunction transistor 77 is connected to terminal of capacitor 42 through lead 49.

Junction 79 is connected to one side of primary winding 30 of transformer 23 through lead 90. Terminal 91 is connected through lead 92 to the other side of primary winding 30 of transformer 23. Diode 93 is connected between terminals 91 and 79 to clip pulses so as to provide signal polarity pulses.

Summarizing operation of the circuit, capacitor 42 is charged through resistances 39, 40 and diode 41 from terminal 37 of the D.C. voltage source. When the capacitor voltage of capacitor 42 reaches a predetermined value or level at terminal 80, unijunction transistor 77 will fire, becoming highly conductive between base 1, terminal 78, and emitter terminal 80, so as to allow capacitor 42 to discharge into the primary winding 30 of transformer 23. The pulse on primary winding 30 applies corresponding pulses on secondary windings 24 and 25 which appear on gating terminals 26 and 28 of the silicon controller rectifiers. The silicon controlled rectifier, which has a positive voltage on its anode at that time, will start conduction and conduct current from the input terminals to the output terminals until the end of the half cycle of line frequency. The time in the cycle at which the pulse is generated at terminal 79 and triggers the silicon controlled rectifier network 23 determines the average voltage of the output voltage. The rate at which capacitor 42 charges and the time at which terminal 80 reaches the firing potential of the unijunction transistor 77 are varied by introducing an additional charging current through resistors 45 and 47 through diode 48 to capacitor 42 by line 49.

The voltage applied is composed of the voltage on slider 44A of potentiometer 44, plus the voltage applied across resistor 45 from signal input terminals 50 and 51, plus the voltage applied across resistor 47 from the current limiting source or other signal across leads 68, 69. Hence, the variations in the input signals produce variations in the charging rate of capacitor 42 and determine the time at which the unijunction transistor fires in the corresponding half cycle.

It should be apparent that changes can be made in details of the circuit without departing from the spirit of the invention except as defined in the appended claims.

What is claimed is:

1. In a circuit for controlling output voltage in response to a plurality of input signals, the combination including an A.C. input, an output, silicon controlled rectifier means connected between said A.C. input and said output, a network for supplying gating pulses for said silicon controlled rectifier means including a regulated D.C. voltage source directly connected through a resistance network to charging capacitor means, means for introducing a plurality of input signals directly connected to said resistance network for controlling the charging rate of said charging capacitor means, and unijunction transistor means connected to said resistance network, said charging capacitor means and to said silicon controlled rectifier means, said unijunction transistor firing when said charging capacitor means reaches a predetermined level and generating a gating pulse at a predetermined time in the cycle for controlling said silicon controlled rectifier means.

2. In a circuit for controlling output voltage in response to a plurality of input signals, the combination including an A.C. input, an output, silicon controlled rectifier bridge meas connected between said A.C. input and said output, pulse transformer means connected to the gate terminals of said silicon controlled rectifier bridge means, a network for supplying gating pulses for said silicon controlled rectifier bridge means including a regulated D.C. voltage source directly connected through a resistance network to charging capacitor means, means for introducing a plurality of input signals directly connected to said resistance network for controlling the charging rate of said charging capacitor means, one of said input signals being a current limiting network, and unijunction transistor means connected to said resistance network, said charging capacitor means and to said silicon controlled rectifier bridge means pulse transformer, said unijunction transistor firing when said charging capacitor means reaches a predetermined level and generating a gating pulse at a predetermined time in the cycle for controlling said silicon controlled rectifier bridge means.

3. In a circuit for controlling output voltage in response to a plurality of input signals, the combination including an A.C. input, an output, silicon controlled rectifier bridge means connected between said A.C. input and said output, pulse transformer means connected to the gate terminals of said silicon controlled rectifier bridge means, a network for supplying gating pulses for said silicon controlled rectifier bridge means including a regulated D.C. voltage source directly connected through a resistance network to charging capacitor means, means for introducing a plurality of input signals directly connected to said resistance network for controlling the charging rate of said charging capacitor means, unijunction transistor means connected to said resistance network, said charging capacitor means and to said silicon controlled rectifier bridge means pulse transformer, said unijunction transistor firing when said charging capacitor means reaches a predetermined level and generating a gating pulse at a predetermined time in the cycle for controlling said silicon controlled rectifier bridge means, and time-delay network means connected to said resistance network for providing gradual energization of said pulse transformer when initially energized.

4. In a circuit for controlling output voltage in response to a plurality of input signals, the combination including an A.C. input, an output, silicon controlled rectifier bridge means connected between said A.C. input and said output, pulse transformer means connected to the gate terminals of said silicon controlled rectifier bridge means, a network for supplying gating pulses for said silicon controlled rectifier bridge means including a regulated D.C. voltage source directed connected through a resistance network to charging capacitor means, means for introducing a plurality of input signals directly connected to said resistance network for controlling the charging rate of said charging capacitor means, one of said input signals being a current limiting network, unijunction transistor means connected to said resistance network, said charging capacitor means and to said silicon controlled rectifier bridge means pulse transformer, said unijunction transistor firing when said charging capacitor means reaches a predetermined level and generating a gating pulse at a predetermined time in the cycle for controlling said silicon controlled rectifier bridge means, and time-delay network means connected to said resistance network for providing gradual energization of said pulse transformer when initially energized.

References Cited by the Examiner

UNITED STATES PATENTS 2,977,523   3/1961   Cockrell _____ 318—331

OTHER REFERENCES

General Electric: "Silicon Controlled Rectifier Manual," 2nd ed., FIG. 8.7, p. 121, Dec. 29, 1961.

LLOYD McCOLLUM, *Primary Examiner.*

J. M. THOMSON, W. E. RAY, *Assistant Examiners.*